May 3, 1927.

F. C. ALLEN

1,626,590

MILLING MACHINE

Filed Aug. 7, 1922   8 Sheets-Sheet 1

INVENTOR
F. C. Allen
BY
ATTORNEY

May 3, 1927.

F. C. ALLEN

1,626,590

MILLING MACHINE

Filed Aug. 7, 1922

INVENTOR
F. C. Allen
BY
ATTORNEY

May 3, 1927.

F. C. ALLEN 1,626,590

MILLING MACHINE

Filed Aug. 7, 1922

INVENTOR
F. C. Allen
BY
ATTORNEY

May 3, 1927.  
F. C. ALLEN  
1,626,590  
MILLING MACHINE  
Filed Aug. 7, 1922  
8 Sheets-Sheet 5

INVENTOR  
F. C. Allen  
BY  
ATTORNEY

May 3, 1927.　　　　F. C. ALLEN　　　　1,626,590

MILLING MACHINE

Filed Aug. 7, 1922　　　　8 Sheets-Sheet 6

INVENTOR
F.C. Allen
BY
ATTORNEY

May 3, 1927.

F. C. ALLEN 1,626,590

MILLING MACHINE

Filed Aug. 7, 1922

INVENTOR
F. C. Allen
BY
ATTORNEY

May 3, 1927.

F. C. ALLEN

MILLING MACHINE

Filed Aug. 7, 1922

INVENTOR
F. C. Allen
BY
ATTORNEY

Patented May 3, 1927.

1,626,590

UNITED STATES PATENT OFFICE.

FREDERICK C. ALLEN, OF HARTFORD, CONNECTICUT, ASSIGNOR TO PRATT & WHITNEY COMPANY, OF NEW YORK, N. Y., A CORPORATION OF NEW JERSEY.

MILLING MACHINE.

Application filed August 7, 1922. Serial No. 580,196.

This invention relates generally to metal working machines of both the reciprocating and rotary type and especially to milling machines, as illustrated in the accompanying drawings.

The primary object of the invention is to provide in a single construction a machine capable of operating as any one of several types of milling machines. The machine illustrated in the drawings may be used as a plain reciprocating milling machine of the ordinary type or as an automatic machine with automatic fast and slow speeds in the forward direction and a rapid speed in the backward or traversing direction; as a rotary milling machine, the same change gears and automatic features of the reciprocating mechanism being used for rotating the table; or as a milling machine of the combined reciprocating and indexing type, this last combination comprising a reciprocating and rotary work support preferably including a reciprocatory slide having a work support or table rotatably mounted thereon, the table being indexed upon and synchronously with the backward stroke of the slide in a manner to prevent marring of the finished work and to bring an unmilled piece of work in front of the milling cutter ready for a milling operation thereon, the operations being continuous and automatic and the operator being required only to remove the finished pieces of work and mount unmilled pieces in their stead.

It is accordingly an object of the invention to provide a machine of the type stated adapted to be used either as a linear or as a rotary milling machine.

It is an object of the invention to provide a machine of the type stated with an automatic table reciprocating mechanism including an improved arrangement of clutches and means including a rotary dog wheel driven from the table reciprocating mechanism for directly and automatically operating the clutches.

Another object of the invention is to provide a milling machine of the reciprocating and indexing type with means including a plurality of clutches and controlling mechanism therefor for automatically indexing the work support synchronously with and on the backward stroke thereof whereby to keep the cutter positioned between two adjacent pieces of work.

Another object of the invention is to provide a machine of the type last stated with means for varying the amount of table indexing movement whereby to operate on a varied number of work pieces secured to the table.

Another object of the invention is to provide a machine of the type last stated with means for varying the indexing speed of the table relative to its reciprocating speed whereby to provide proper clearance of the cutter between adjacent work pieces of various shapes and sizes.

With the above and other objects in view, my invention consists in the features of construction and operation set forth in the following specification and illustrated in the accompanying drawings. In such drawings annexed hereto and forming a part of this specification, I have shown my invention as embodied in a milling machine of the knee type but it will be understood that the invention can be otherwise embodied and that the drawings are not to be construed as defining or limiting the scope of the invention, the claims appended to this specification being relied upon for that purpose.

Referring to the figures of the drawings:

Figures 1 and 2 are side and front elevations, respectively, of a milling machine comprising the present invention.

Fig. 3ª is a detail plan view of a part of the locking means for the table.

Fig. 11ª is a fragmentary detail view showing the operation of one of the controlling dogs on the dog wheel.

Fig. 12 is a fragmentary elevation partially in section on line 12—12 of Fig. 5.

Referring to the drawings by reference characters, 1 indicates the column and 2 the base of a milling machine comprising my invention. A milling cutter 3 is rotatably supported on a spindle 4 mounted in the column and an end bearing 5 on an over-arm construction 6. This over-arm construction comprises the subject matter of my Patent No. 1,543,242 granted June 23, 1925. The work is adapted to be mounted on a support or table 7 on a vertically adjustable knee 8. The cutter is adapted to be operated from a power pulley 9 and a telescopic shaft 10 provides a driving connection to the table operating mechanism supported by the knee.

The knee 8 is vertically adjustable on guideways 11 by means of screws (not shown) supported in bearings 12 and operated by a shaft 13. A saddle 14 is adjustable on ways 15 by means of a screw 16 journaled in a bracket 17. A gear box 18 and an oil reservoir 19 are supported respectively at the ends of the saddle. A slide or carriage 20 is mounted for reciprocation on ways 21 of the saddle 14 and the work support or table 7 is rotatably mounted on the slide. The slide is preferably provided with an oil trough 22 therearound as illustrated and the table is supported on a circumferential bearing 23 on the slide and rotatable about a center pin 24 supported therein.

It should be understood that the slide 20 and table 7 may be operated either by hand or power. Such power, as illustrated in the accompanying drawings, is derived entirely through the telescopic shaft 10 and the machine may be adjusted to perform such operations either in a semi-automatic or a fully automatic manner. Gearing and controlling mechanism are provided in the knee for automatically reciprocating the slide on its ways 21 and, with the table secured against rotation on the slide, the machine may be used as a regular automatic milling machine of the reciprocating type. By making certain minor adjustments, the slide reciprocating mechanism may be set to rotate the table 7, the slide being locked against movement at this time. In this manner the machine may be used as a regular rotary milling machine. It should be understood that the various gearing and automatic controlling mechanisms in the knee serve either to reciprocate the slide 20 or to rotate the table 7, both such operations being entirely automatic and at variable speeds when desired. As heretofore stated, the machine may furthermore be operated as a milling machine of the reciprocating and indexing type. As thus operated, the slide is automatically reciprocated and rotated. The cutting operation takes place during movement in one direction, and the table is automatically indexed synchronously with and on the backward stroke of the slide. During this backward stroke of the slide the table is simultaneously rotated at a predetermined relative speed. The mechanism for performing these several operations will now be described in detail.

*Slide reciprocating mechanism.*

A main drive shaft 25 is operated from the telescopic shaft 10. A pair of worms 26 and 27 on the shaft 25 mesh respectively with worm wheels 28 and 29 on shafts 30 and 31 whereby fast and slow rotations respectively are transmitted to such shafts. A gear 32 on the shaft 30 meshes with two gears 33 and 34 loose respectively on clutch shafts 35 and 36. The inner ends of these gears are formed with clutch teeth adapted respectively to be engaged by the teeth of clutches 37 and 38 splined respectively on shafts 35 and 36. Each of these shafts may therefore be driven rapidly, in the direction indicated by the arrows on gears 33 and 34 in Fig. 13 by respectively engaging clutches 37 and 38 with such gears.

A clutch gear 39 on the opposite side of clutch 38 is driven at a relatively slow speed from shaft 31 through the following gearing. A gear 40 on the shaft 31 meshes with a gear 41 secured to a sleeve 42. This sleeve extends through the outer portion of the gear box 18 where it is provided with a gear 43 driving, through gears 44, 45 and 46, a shaft 47 extending through the sleeve 42. Gears 43, 44, 45 and 46 comprise the change gears of the machine whereby the cutting speed of the table may be varied as desired. Each pair of gears 43—44 and 45—46 are invertible for changing the table speed and gears of other sizes may be substituted therefor if other speeds are desired. A gear 48 on the inner end of shaft 47 meshes with the clutch gear 39. The speed of gear 39 may be varied as desired by means of the said change gears. The gear 39 rotates in the same direction as gear 34 but at a relatively slower speed. By engaging clutch 38 with gear 39, the clutch shaft 36 may therefore be driven in the same direction as gear 34 but at a relatively slower speed.

Figure 13:
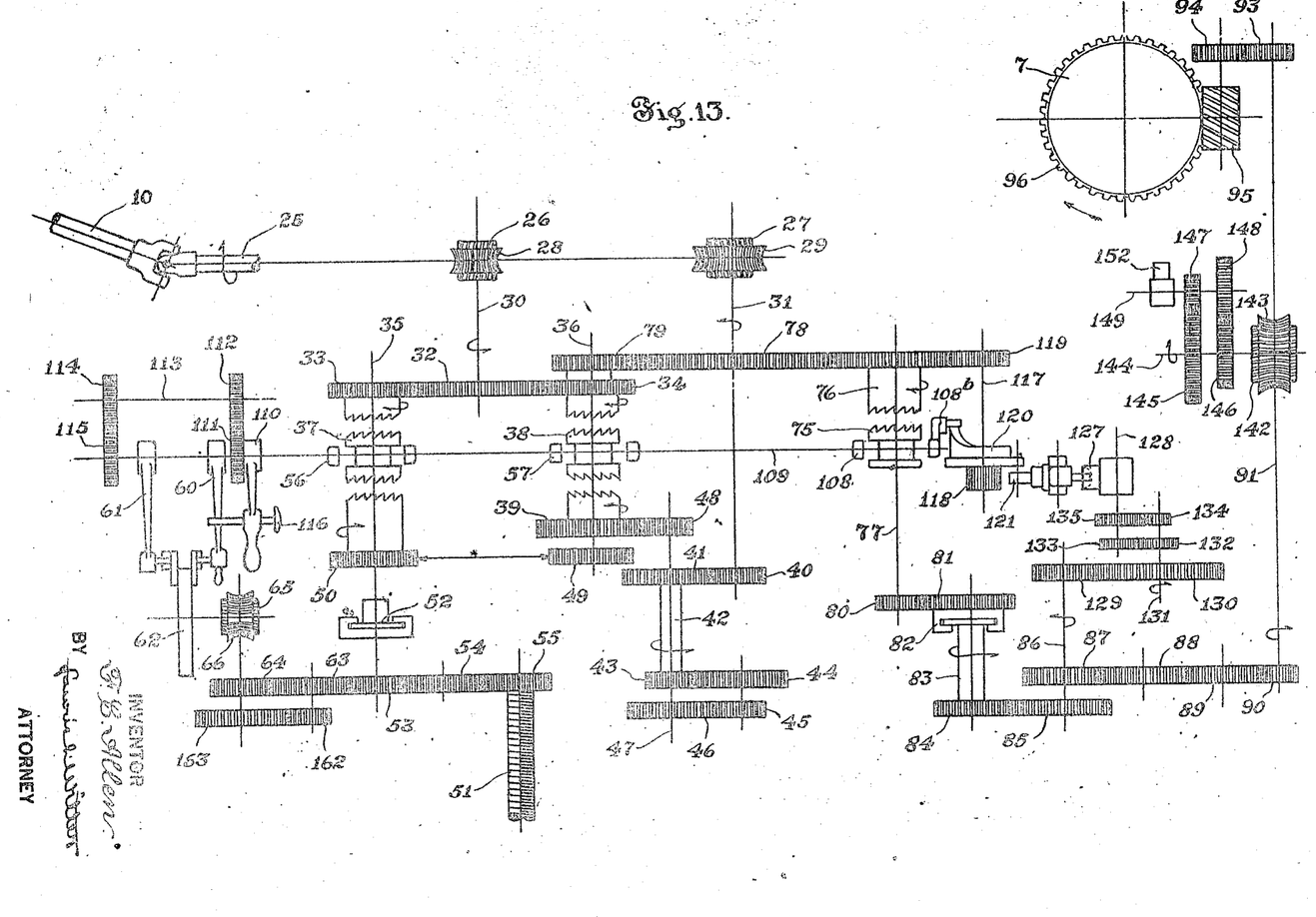
Fig. 13 is a diagrammatic view of the gearing and controlling mechanism.

A gear 49 fixed to clutch shaft 36 meshes with a gear 50 loose on clutch shaft 35. The rotations transmitted to shaft 36 through either gear 34 or 39 may thereby be transmitted to the gear 50. This gear 50 is provided with clutch teeth adapted to be engaged by clutch 37 to drive the shaft 35 in the direction of the arrow on gear 50 (Fig. 13). The shaft 35 is operatively connected to the slide or carriage screw 51 through a friction driving element 52, gear 53, idler gear 54, and gear 55 fixed to the screw.

It will be noted that gears 33 and 50 drive in opposite directions. The gear 50 rotates in a direction to move the table forwardly and the gear 33 rotates in a direction to traverse the table backwardly. The rotation of gear 33 is always rapid whereby the table is always traversed rapidly backward when clutch 37 is engaged with gear 33. The gear 50 is driven slowly when clutch 38 is engaged with gear 39 and rapidly when such clutch is engaged with gear 34. The clutch 38 therefore always drives through the gear 50 and clutch 37. By properly manipulating the clutches, the screw 51 may be rotated in a direction and at a speed to drive the slide forwardly at fast and slow speeds as desired and backwardly at a rapid speed. When clutch 37 is in a neutral position, the shaft 35 and the mechanism operated thereby are inoperative whatever may be the position of the clutch 38. The clutch 37 may be termed the forward and backward clutch since it controls the forward and backward movements of the table and the clutch 38 may be termed the variable speed clutch since it controls the forward speeds of the table. A dog or tappet wheel mechanism, now to be described, serves to operate the clutches 37 and 38 in a fully automatic manner.

The automatic means for controlling the carriage reciprocating movements are as follows: Clutches 37 and 38 are shifted respectively by means of clutch yokes 56 and 57 operated respectively by an outer tubular shaft 58 and an inner tubular shaft 59. Spring pressed detents 56ª and 57ª act on yokes 56 and 57 to assist in fully engaging the clutches 37 and 38. Oscillating levers 60 and 61 are respectively keyed to the outer ends of shafts 58 and 59 and are adapted to be engaged and operated by dogs or tappets on a rotary dog wheel or disk 62. This disk is rotated from the gear 53 through two gears 63 and 64, worm 65 and worm wheel 66 mounted on the dog wheel shaft. This rotation of the dog wheel being derived from gear 53, which also drives the carriage feed screw, will correspond in direction and velocity to the carriage movements. The gear ratio for driving the disk 62 is such as to cause the disk to make slightly less than a complete rotation for the maximum linear stroke of the carriage. Dogs or tappets 67 and 68 adjustably mounted on one side of the disk and other dogs or tappets 69 and 70 adjustably mounted on the other side of the disk are respectively adapted to engage and operate the levers 60 and 61.

Figure 11:
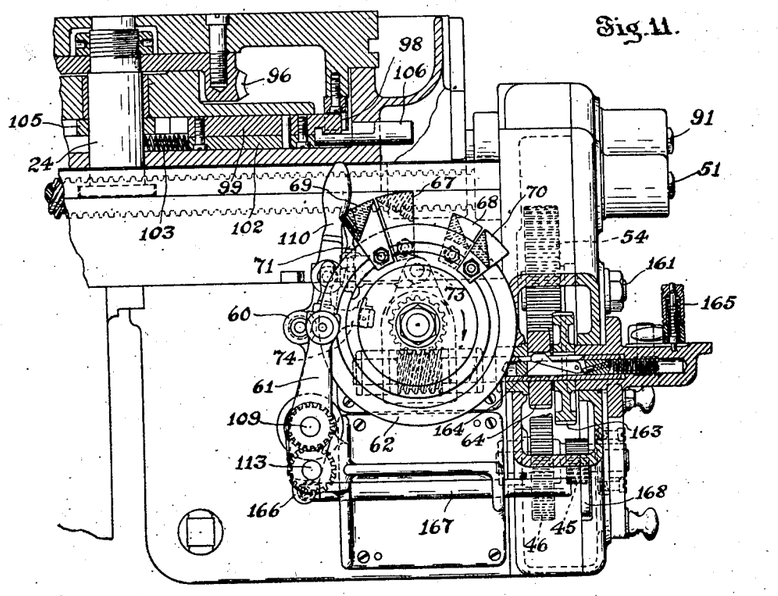
Fig. 11 is a fragmentary elevation showing the clutch controlling dog wheel and other parts in section.

It will be understood that the positions of the dogs on the dog wheel depend upon the character of work to be operated upon. As illustrated in Fig. 11, the dogs are set to move the table slowly forward at cutting speed during the greater part of its forward stroke. The dog 67 engages clutch 37 with the forwardly driving clutch gear 50. Dog 68 moves clutch 37 in the opposite direction to engage the same with the backwardly driving clutch gear 33. Dog 69 engages clutch 38 with slow clutch gear 39. Dog 70 moves clutch 38 in the opposite direction to engage the same with the fast forward clutch gear 34.

Figures 11A, 12:
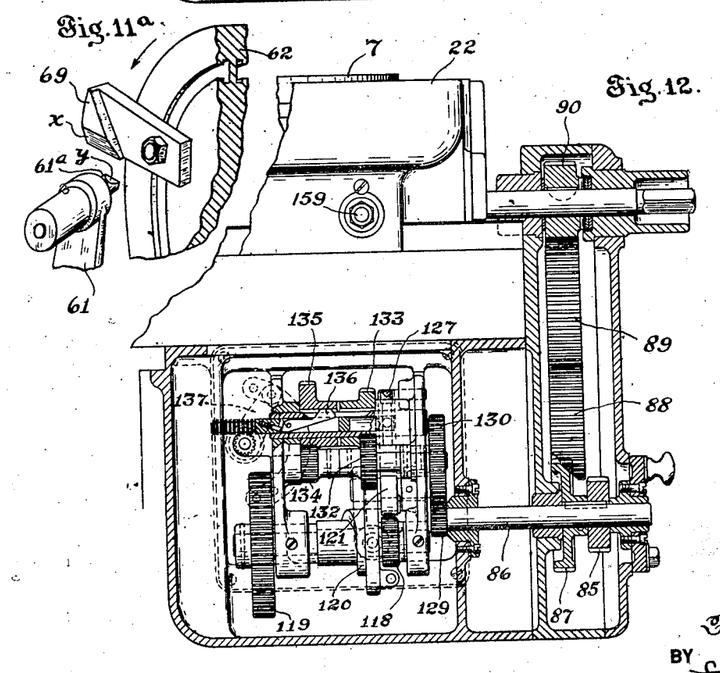

During the operation hereinafter described, it will be noted that the dog 69 on its inoperative backward stroke in the direction of the arrow (Fig. 11ª) must pass over the engaging pin 61ª mounted in the lever 61. For the purpose of permitting this passage, I slidably mount the pin in the lever and normally hold the same in an outward position by means of a spring 61ᵇ. The rear engaging surfaces x and y of the dog and pin are beveled as illustrated in Fig. 11ª whereby the pin will be forced inwardly by the dog by engagement of the latter therewith.

The operation of the mechanism as thus far described is as follows: With the parts in the position shown in Fig. 11, clutches 37 and 38 are respectively engaged with clutch gears 50 and 39 and the table is moving forward at slow cutting speed. Such movement rotates the dog wheel 62 in the direction of the arrow (Fig. 11). This slow cutting movement continues until the dog 70 engages lever 61 and shifts clutch 38 from slow gear 39 to fast gear 34. The table is therefore moved at fast speed in the same direction until dog 68 engages lever 60. Dog 68 throws lever 60 to the left (Fig. 11) and moves clutch 37 from the forward driving gear 50 to the fast backward driving gear 33. The table is thereby traversed rapidly backward, the direction of rotation of the dog wheel reversing therewith. The dog 69 passes idly by the lever 61 in the manner heretofore described and shown in Fig. 11ª. This fast traversing movement continues until dog 67 engages and moves lever 60 to the right, thus moving clutch 37 from gear 33 to gear 50. Clutch 38 still being in engagement with the fast forward driving gear 34, the table movement will be reversed to rapid forward, the direction of rotation of the dog wheel reversing therewith. The dog 69 next moves the lever 61 to the right and the clutch 38 from fast gear 34 to slow gear 39. The table now moves slowly forward at cutting speed and is again automatically controlled by the dog wheel through the cycle just described. It will be noted that the operations throughout are entirely automatic.

It should be understood that if desired the forward movement of the table may be broken up into a plurality of fast and slow movements whereby to operate successively on several work pieces. To so operate the table, the dog wheel should be provided with as many pairs of dogs 69 and 70 as there are pieces of work whereby each dog 69 provides a slow table movement for cutting a work piece and its adjacent dog 70 provides a fast table movement in the same direction between adjacent work pieces.

Means is provided for stopping the table at the end of the backward traversing movement after the completion of each cycle of operations, when desired, thus rendering the machine semi-automatic in operation. For this purpose I provide a latch 71 pivoted to the bearing 72 at 73. This latch in operation is adapted to engage a projection 74 on the lever 60. In Fig. 11, the latch is shown in its operative position. When not in use the latch may be thrown backwardly about its pivot 73 to the other side of bearing 72. It will be noted that the engaging surfaces of latch 71 and projection 74 are bevelled on one side and straight on the other. The bevelled surfaces permit the dog 68 to move the lever 60 to the left to engage the clutch 37 with its fast traversing gear 33. However when dog 67 next engages the lever 60 to move clutch 37 from gear 33 to gear 50, the said straight surfaces engage and stop the lever with the clutch in its neutral position. The table is therefore stopped at the end of its backward traversing movement.

The machine thus far described is adapted to operate only as a plain or automatic milling machine of the reciprocating type. During such operation, the table 7 is locked to the slide 20 by means hereinafter described. Mechanism will now be described whereby the machine may be operated as a continuous milling machine of the combined reciprocating and indexing type.

*Table indexing mechanism for continuous milling.*

Figure 4:
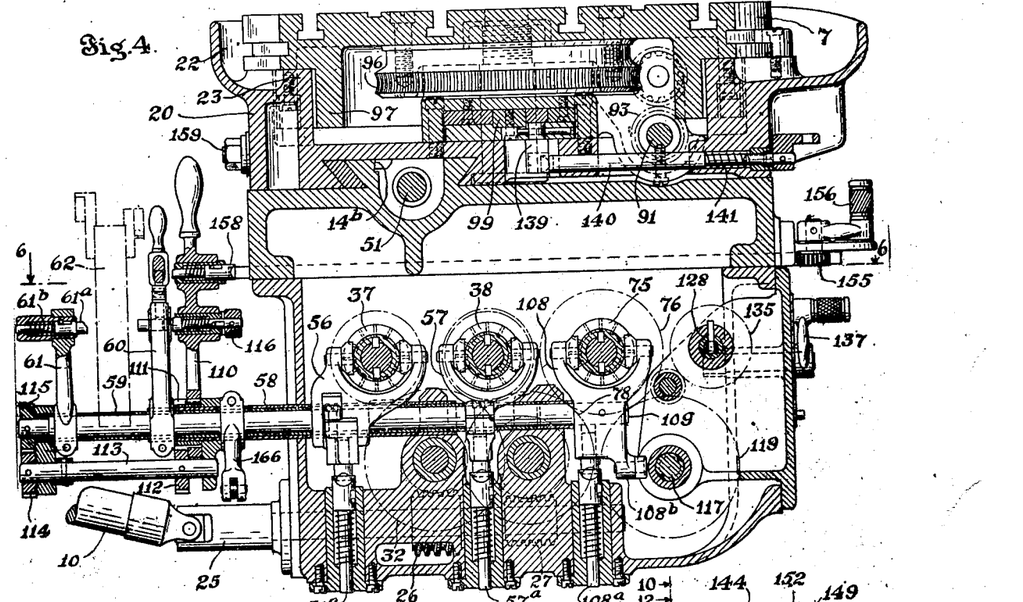
Fig. 4 is a vertical transverse section taken on line 4—4 of Fig. 6 and through the work support.

The table 7 is rotatably mounted on the slide 20 as shown in Fig. 4. When using the machine as a continuous milling machine, the table is automatically indexed upon the return movement of the slide, such indexing being accomplished through a third clutch 75. Referring particularly to Figs. 4 and 13, a clutch gear 76 loose on a clutch shaft 77 is driven from an idler gear 78 freely mounted on axis 31 meshing with gears 76 and a gear 79 fast on clutch shaft 36. Shaft 77 may be driven from gear 76 by engaging therewith clutch 75 which is splined to the shaft.

The table is adapted to be rotated from the shaft 77 by the following mechanism: A gear 80 fast on shaft 77 meshes with a gear 81 forming one part of a frictional element 82 on a shaft 83. Removable gears 84 and 85 on shafts 83 and 86 provide change gears hereinafter described whereby the speed of the table indexing may be varied. Gears 87, 88, 89 and 90 provide a driving connection between shaft 86 and a splined shaft 91 journaled in the saddle and extending along the ways 21 thereof and through the slide. The slide carries a bracket or box 92 supporting a pair of intermeshing gears 93 and 94 and a worm 95 engaging a large worm gear 96 secured to the under side of the table. The gear 93 is splined for longitudinal movement on the shaft 91 and the gear 94 and worm 95 are secured together in axial alinement.

*Table locking mechanism.*

Figures 1, 2, 3A:
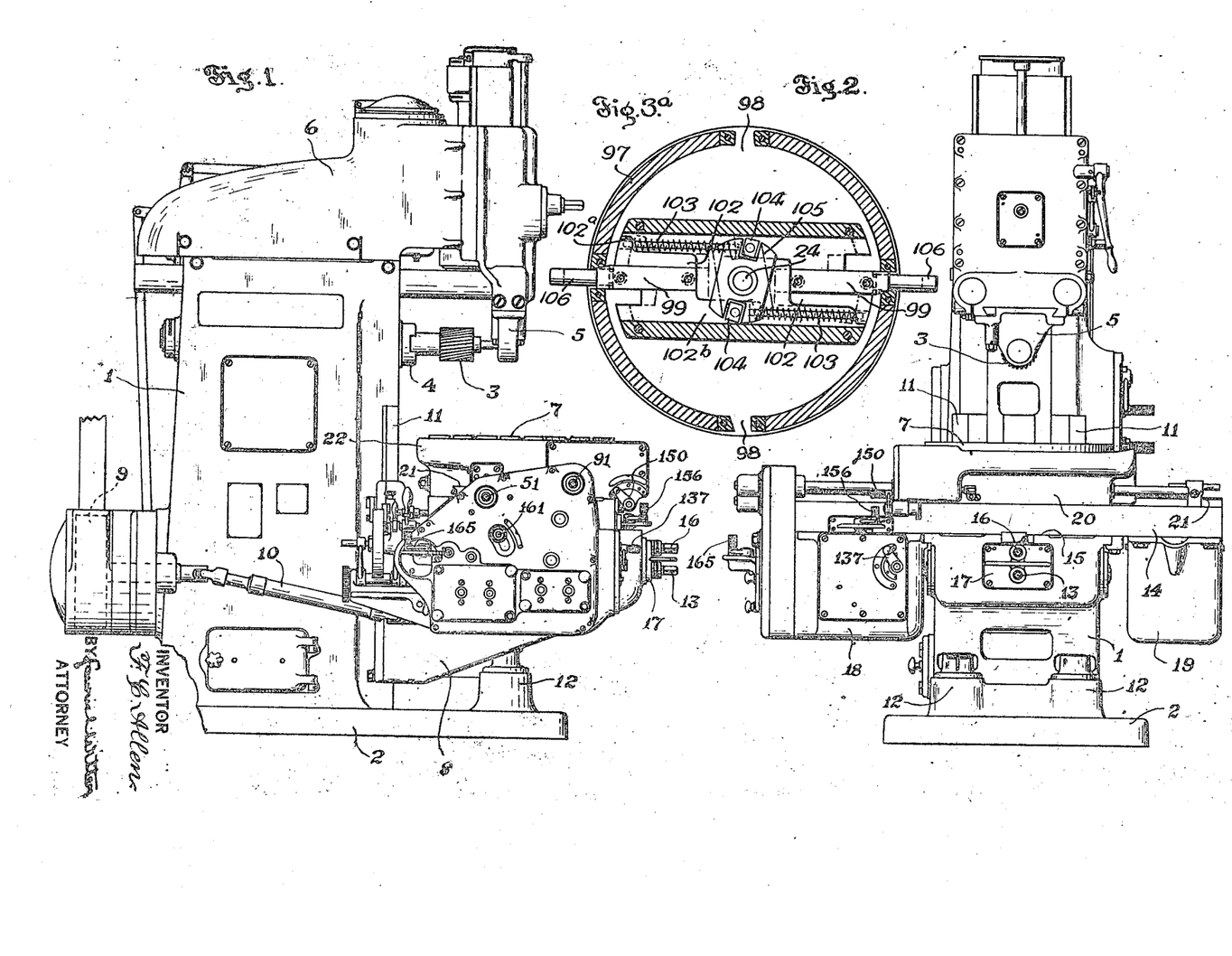
Figure 3:
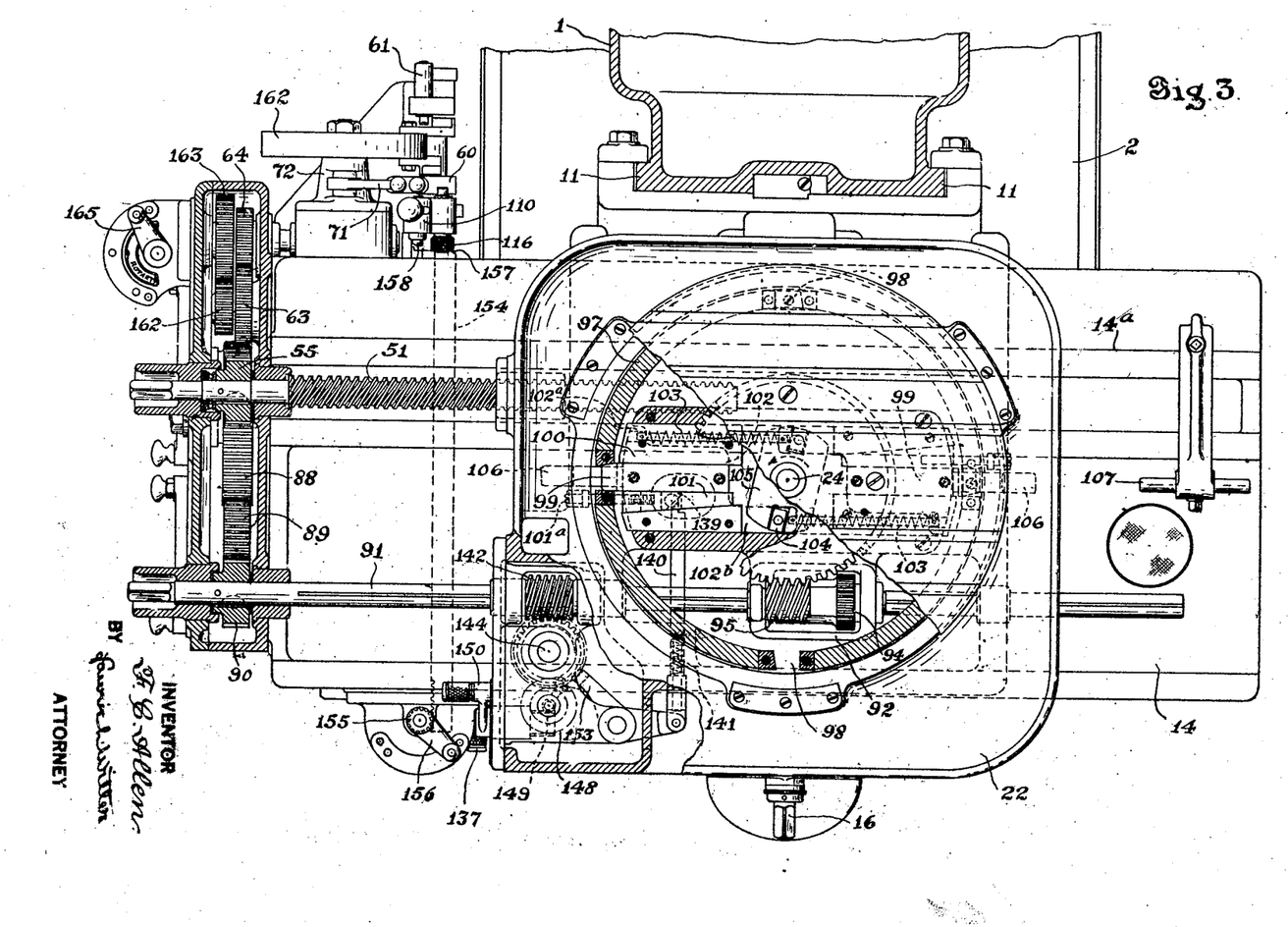
Fig. 3 is a plan view of the work support and its operating mechanism, certain portions thereof being shown in section.

The table is normally held against rotation on the slide by mechanism comprising a pair of lock bolts. This mechanism and the means for operating the same is best shown in Figs. 3, 4 and 11. The table 7 is provided with a circumferential downwardly-extending extension 97 having four notches 98 therein 90° apart. These notches are adapted to be engaged by diametrically opposite lock bolts 99 slidably mounted in guideways in the slide 20. Each lock bolt slides between a plane gib 100 and a tapered gib 101, the latter being adjustable longitudinally for wear by means of a screw 101$^a$. Each lock bolt has secured to its under side a peculiar shaped plate 102. This plate has a projection 102$^a$ at one side and a tail 102$^b$ at its other side. A spring 103 positioned at each side of the lock bolts has one end resting against the projection 102$^a$ of one plate and against the tail 102$^b$ of the other plate whereby such springs operate to normally force the bolts outwardly into engagement with the notches 98. The tail 102$^b$ of each plate is connected by a swivel block 104 to a plate 105 swivelled on the center pin 24. As thus far described, both lock bolts are alike. The springs 103 operate to normally force the bolts radially outward in opposite directions and into notches 98. Rotary movement of the swivel plate 105 in the direction of the arrow (Fig. 3) will operate against the action of the springs 103 to withdraw both bolts from engagement with such notches. This swivel plate 105 is rotated and the lock bolts withdrawn from their notches by a plunger extension 106 of one or the other of the bolts which passes through the wall of the slide and is adapted to contact with a bunter stop 107 adjustably mounted upon and clamped to the dovetail guideway 14ª of the saddle 14. In the usual and automatic operation of the machine, the plunger extension 106 will engage the stop 107 (in the position shown in Fig. 3) and disengage the lock bolts at the finishing of each milling operation and just prior to the engagement of the slide backward traversing and table rotating clutches.

Figure 14:
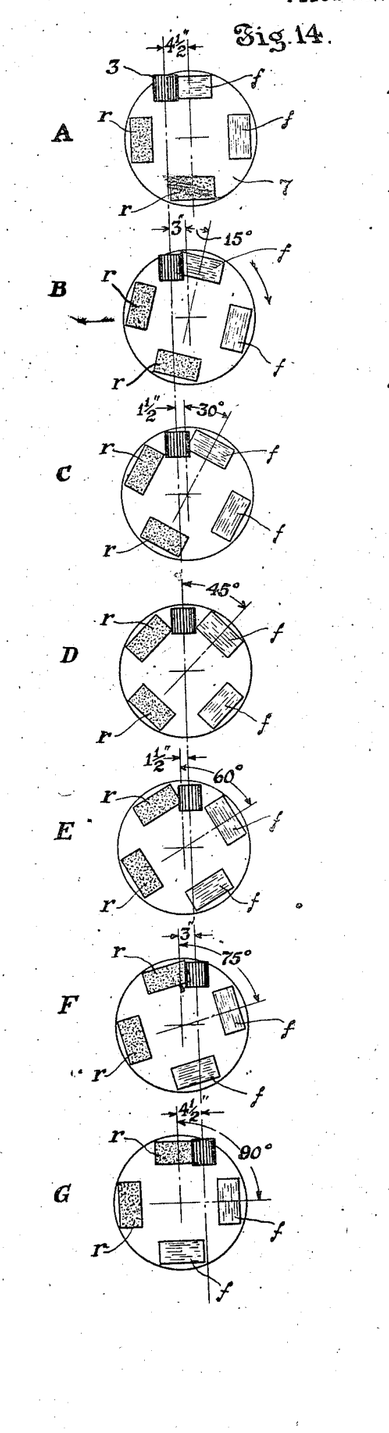
Fig. 14 shows diagrammatically the work support and milling cutter in a series of relative positions occupied during the backward traversing and indexing movement of the support.
Figure 15:
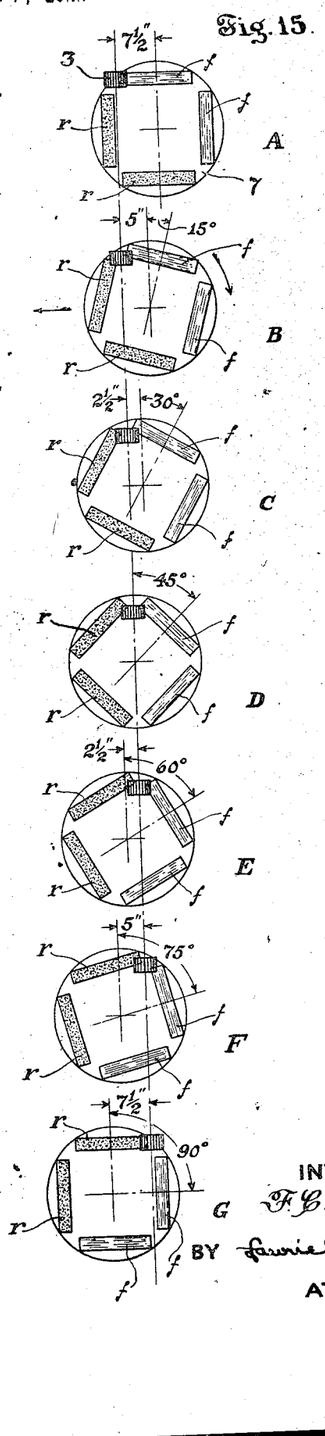
Fig. 15 is similar to Fig. 14 but shows the work support and milling cutter in a different series of relative positions resulting from the different relative movements necessary to keep the cutter positioned between adjacent pieces of work, which work pieces are of a different size and shape from those shown in Fig. 14.

When operating the machine with four pieces of work placed 90° apart on the table as illustrated in Figs. 14 and 15, it is necessary at each indexing to rotate the table 90°. The mechanism for automatically releasing the table has just been described and that for indexing the same through the desired angle will be hereinafter described.

As before stated, the table is automatically indexed upon the backward movement of the slide, the indexing and backward traversing being so timed that the cutter is held in position between two adjacent pieces of work during the indexing operation. The clutch operating arrangement is such that the table is started to index simultaneously with the starting of the said traversing movement thereof. Clutch 75 is operated by a yoke 108 on a shaft 109, a spring pressed detent 108ª acting on the yoke to assist in fully engaging the clutch. Shaft 109 is operated from a clutch shifting lever 110 through gears 111 and 112, shaft 113, and gears 114 and 115, lever 110 being loosely mounted and gear 115 being pinned to the shaft. A pull pin 116 is provided in lever 110 and, in its lever operating position, extends across the path of movement of lever 60 as shown in Fig. 13. The pin may be drawn outwardly away from such path when desired. In the operation heretofore described, the dog 68 throws lever 60 to the left (Fig. 11) and moves clutch 37 from the forward driving gear 50 to the fast backward driving gear 33. The table is thereby traversed rapidly backward. This movement of lever 60 carries lever 110 therewith and shifts clutch 75 into engagement with clutch gear 76. The rotation of the table is thereby started simultaneously with the backward traversing movement thereof, the table, of course, having been unlocked at the end of the milling stroke by the bunter stop 107, as heretofore described. This rotary indexing of the table must be stopped and the table locked after the same has been indexed through the desired angle. The indexing movement is stopped by mechanism automatically disengaging the clutch 75 which mechanism will now be described.

Figure 5:
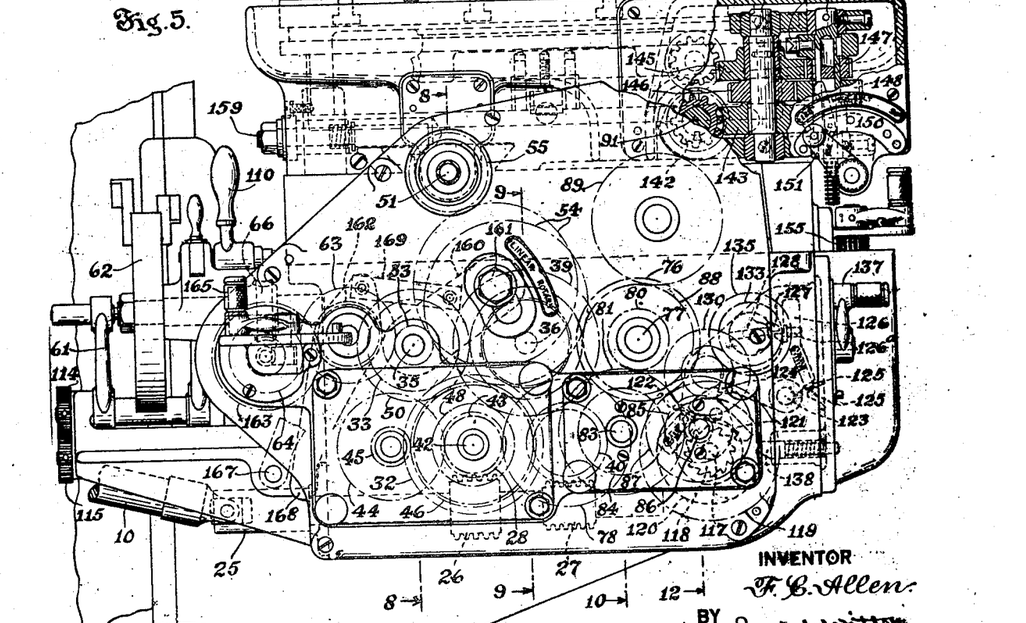
Fig. 5 is an end view thereof partially in section.
Figure 6:
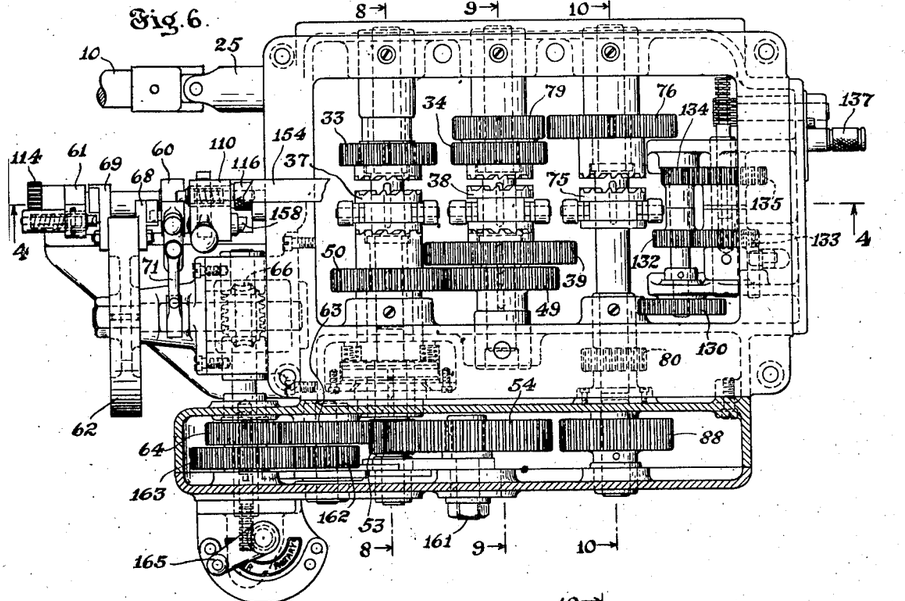
Fig. 6 is a horizontal sectional view taken approximately on line 6—6 of Fig. 4.
Figure 7:
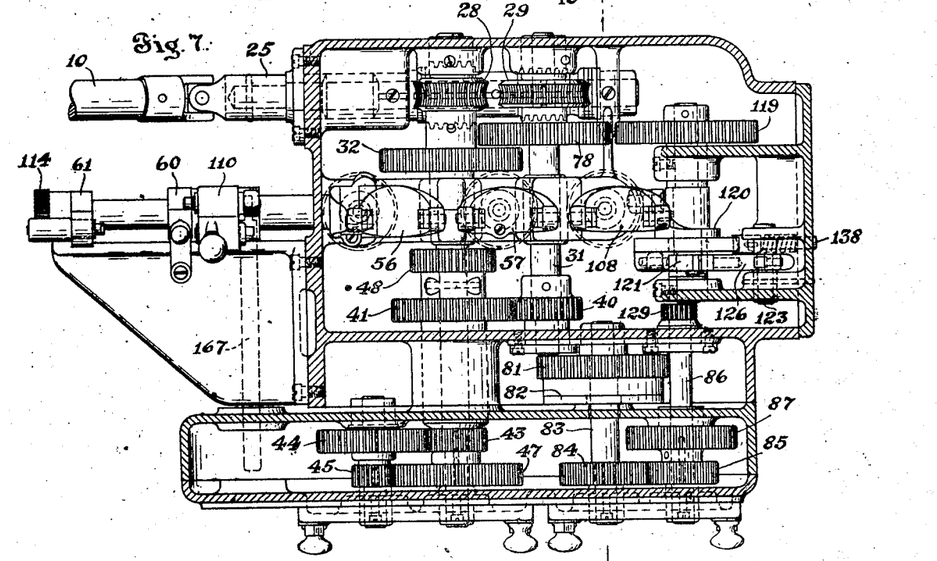
Fig. 7 is a view similar to Fig. 6 but showing the gearing and other mechanism beneath that shown in Fig. 6.
Figure 8:
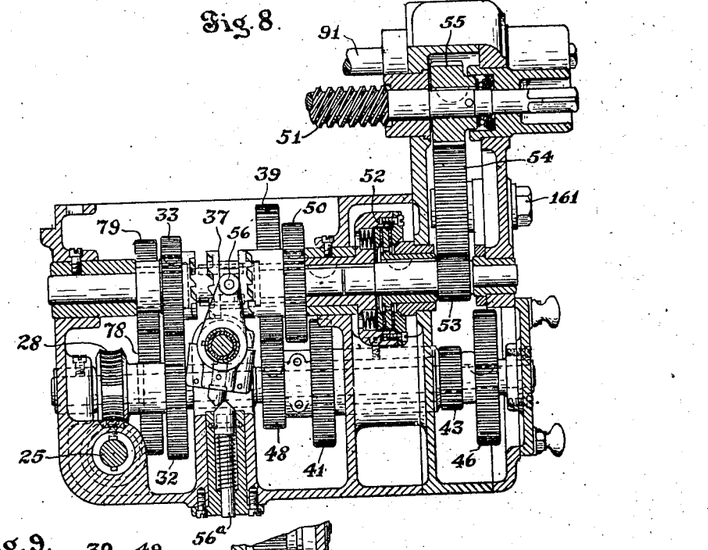
Fig. 8 is a fragmentary vertical section taken approximately on line 8—8 of Figs. 5 and 6.
Figures 9, 10:
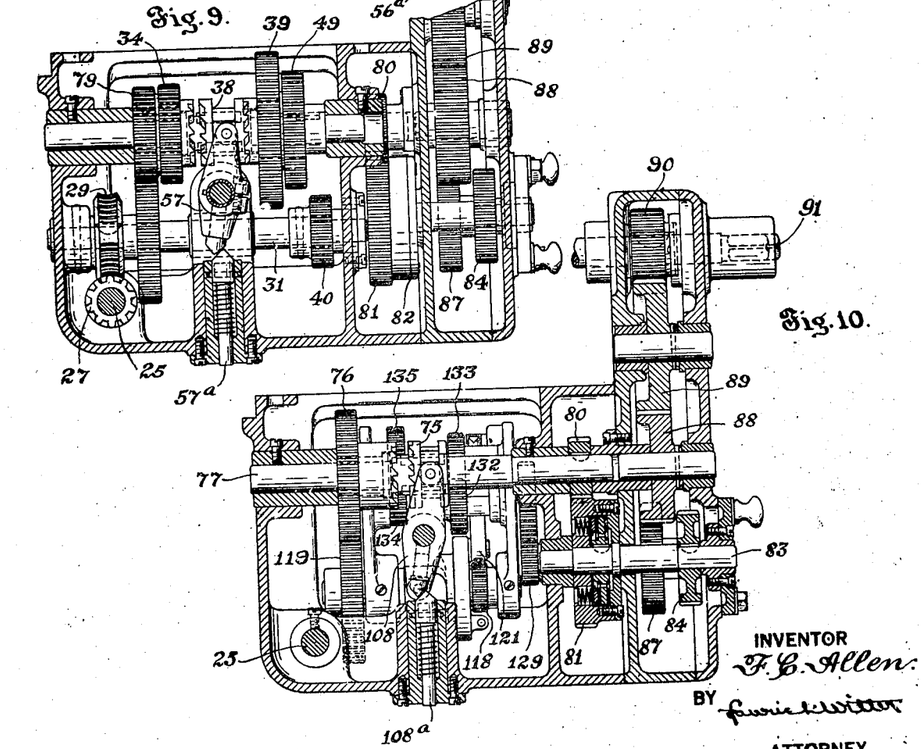
Fig. 9 is a fragmentary vertical section taken approximately on line 9—9 of Figs. 5 and 6.
Fig. 10 is a fragmentary vertical section taken approximately on line 10—10 of Figs. 5, 6 and 7.

Referring particularly to Figs. 5 and 13, a shaft 117 has a ratchet 118 keyed thereto and is driven by a gear 119 thereon meshing with gear 76. A single lobe cam 120 is freely mounted on the shaft 117 adjacent the ratchet and carries a ratchet pawl 121 pivoted thereto. A spring plunger 122 normally forces the pawl into engagement with the ratchet. A latch pivoted at 123 has one arm 124 normally held by a spring pressed plunger 125 in a position to hold the pawl 121 disengaged from the ratchet 118. A second arm 126 of the latch has a shoe 126ª thereon in position to be engaged by a cam 127 on a shaft 128. This shaft is adapted to be rotated from shaft 86 by means of gears 129 and 130 respectively on shafts 86 and 131 and through either gears 132 and 133 or gears 134 and 135. When driving through gears 132 and 133, the shaft 128 is rotated one complete rotation for each quarter turn of the table 7. When driving through gears 134 and 135, the shaft 128 is rotated one complete rotation for each half turn of the table 7. A sliding key 136 operated by a handle 137 (Fig. 12) is adapted to render gears 132 and 133 or gears 134 and 135 operative.

A spring pressed detent 138 normally engages a notch in the lobe cam 120 to hold the same in a neutral position with respect to the arm 108ᵇ of the clutch shifter yoke 108. The engagement of clutch 75 causes shaft 77 to rotate whereupon the cam 127 trips the latch 124 after the table has been rotated through the desired angle, it being understood that the cam 127 does not operate to trip the latch until the table has practically completed the desired indexing movement. The pawl 121 thereupon engages the rotating ratchet 118 and rotates the lobe cam 120 therewith. One complete rotation of this cam brings the high portion thereof against the arm 108ᵇ of the yoke 108 and disengages the clutch 75. The ratchet 118 rotates relatively rapidly and therefore the clutch 75 is disengaged very quickly after the latch is tripped. It should be understood that by adjusting the sliding key 136, the mechanism just described may be made to automatically disengage the clutch 75 upon the rotation of the table through either 90° or 180°.

It is furthermore essential that the lock bolts 99 should be held in a disengaged position during the indexing of the table. This operation is performed automatically either for a 90° or a 180° table indexing movement by the following mechanism: The plate 102 of one of the lock bolts is provided with a lug 139 (Figs. 3 and 4) having a front bevelled face and a rear straight face. This lug is adapted to be engaged by the latch end of a plunger 140 normally pressed against the lug by a spring 141. When the lock bolts are moved inwardly by the engagement of the plunger 106 with the bunter stop 107, the plunger 140 latches behind the lug 139 and holds the bolts disengaged. The mechanism now to be described operates automatically to disengage the latch 140 after the desired indexing of the table.

A worm 142, splined to the shaft 91 and carried by the slide 20 (Figs. 3 and 5), meshes with a worm wheel 143 on a shaft 144. Two gears 145 and 146 fast on shaft 144 mesh respectively with two gears 147 and 148 loose on a shaft 149. The shaft 149 may be operated through either pair of gears 145 and 147 or 146 and 148 by means of a sliding key 150 operated by a handle 151 to connect either of gears 147 and 148 with its shaft 149. A trip cam 152 on the shaft 149 is adapted to engage an arm 153 of a pivoted trip element connected to the plunger 140 and to withdraw such plunger from engagement with lug 139. Gears 145 and 147 are adapted to turn the shaft 149 one full rotation for each slightly-less-than 90° rotation of the table and gears 146 and 148 are adapted to turn the shaft 149 one full rotation for each slightly-less-than 180° rotation of the table. Thus through gears 145 and 147, the table is permitted a 90° rotation before being locked and through gears 146 and 148 the table is permitted a 180° rotation before being locked. Should the table be locked slightly in advance of the disengagement of clutch 75, the friction element 82 will slip and thereby prevent any damage to the machine.

The traversing and indexing movements of the slide 20 and table 7 must be so related that the milling cutter 3 is held clear between two adjacent pieces of work during such operations. This relation must necessarily be adjusted to conform to the number of work pieces on the table and to the size and shape of such pieces. The mechanism already described provides for indexing the table through either 90° or 180°, thus providing for the milling of either four or two work pieces on the table. However, the variation in the size and shape of the work pieces operated upon makes essential a change of table indexing speed relative to the traversing speed, as otherwise an interference between the work and cutter would result. The change of indexing speed is accomplished through the gears 84 and 85. These gears may be transposed to effect one change of speed and other gears may be substituted therefor to effect other changes. The need for this adjustment is illustrated diagrammatically in Figs. 14 and 15 and will now be described.

In Figs. 14 and 15, the table 7 is illustrated diagrammatically as supporting two pieces of finished work $f$ and two pieces of rough work $r$, the pieces in Fig. 14 being of different size and shape from those shown in Fig. 15. In both figures the cutter is stationary and in the first position, marked A, the table has just finished a movement in the cutting direction (to the right). The clutches 37 and 75 now come into operation to traverse the table to the left and index the same clockwise, as shown by the arrows. Since there are four pieces of work placed 90° apart, the table must be indexed through 90° to bring a new piece in front of the cutter. The views marked B, C, D, E, F and G show the several relative positions occupied by the cutter and work during the progress of the indexing and traversing movements. In Fig. 14, at position B, the table is illustrated as having indexed through 15° while the same has been traversing 1½". These relative movements continue throughout the entire indexing operation as illustrated in positions C, D, E, F and G. At position G, the table has completed the 90° indexing during 9" of table traverse and a rough piece of work $r$ is in front of the cutter ready for the next milling operation. It will be noted that throughout the entire operation, as illustrated, the cutter at no time interferes with the work pieces.

In Fig. 15, the table is shown as provided with work pieces of a different size and shape. Were the indexing and traversing movements shown in Fig. 14 used on long work, such as that shown in Fig. 15, an interference would occur between the work and cutter during the traversing and indexing operations. In this figure, it will be noted that the table indexes 15° for each 2½" of table traverse or the entire 90° during 15" of table traverse. It will be noted that as so operated the cutter and work pieces at no time come into interference.

It should be understood that in Figs. 14 and 15, the linear stroke of the table illustrated is not necessarily the full linear stroke of the table. The diagrams are intended to illustrate progressively only certain relative positions occupied by the work and cutter during the indexing and traversing movements. As before stated, the indexing speed relative to the traversing speed may be changed either by transposing gears 84 and 85 or by substituting other gears therefor.

*Operation—Continuous straight line milling.*

The several adjustable parts of the machine just described must first be adjusted to conform to the number of work pieces to be mounted on the table and to the size and shape of such pieces. The dogs 67, 68, 69 and 70 must first be properly adjusted on the dog wheel 62 to give the desired reciprocating movements to the slide 20. For this operation, the dogs 68 and 70 should be set to the same position on the dog wheel whereby both such dogs will operate substantially simultaneously, as will be hereinafter described. When milling with four pieces of work on the table as illustrated in Figs. 14 and 15, the table must be indexed 90° between adjacent work pieces. To perform these operations, the sliding key 136 is set in position to drive the cam shaft 128 through gears 132 and 133 whereby clutch 75 will be disengaged after the table has been rotated 90°. The sliding key 150 is set in position to drive the trip cam shaft 149 through gears 145 and 147 whereby the table will again be locked after a 90° rotation thereof. Gears 84 and 85 of the proper ratio must also be provided to index the table at a speed relative to the backward traversing speed whereby the cutter will be kept free from interference with the work pieces during the traversing and indexing operations.

Assuming that the above adjustments have been properly made, that two rough pieces of work have been secured to the table as at $r$ in Fig. 14, and that the table is in the position shown at G, levers 60 and 61 are moved to the right (Fig. 11) whereby clutches 37 and 38 are engaged respectively with clutch gears 50 and 39 to drive the slide forward at slow cutting speed, to the right (Fig. 3). During this interval, the table moves linearly from the position shown at G to the position shown at A wherein the uppermost work piece $r$ shown at G has been finished as shown at $f$ in view A. As the table reaches the position shown at A in Fig. 14, the same is unlocked from the slide by the plunger 106 engaging the bunter stop 107 as heretofore described. When the lock bolts 99 are forced inwardly, the plunger 140 latches behind the lug 139 thereon and holds the bolts disengaged. During the cutting operation, the dog wheel 62 has been rotating in the direction of the arrow (Fig. 11) and the dogs 68 and 70 (set to same position on wheel 62) engage and move levers 60 and 61 to the left and shift clutches 37 and 38 into engagement with gears 33 and 34. By means of pin 116, lever 60 also carries lever 110 therewith and shifts clutch 75 into engagement with clutch gear 76. The slide and table are thereby reversed and rapidly traversed and the table is rotatably indexed in the direction of the arrows (Fig. 14), the direction of rotation of the dog wheel reversing with the reversal of the slide. At the end of a 90° rotation of the table, the cam 127 releases pawl 121 which engages ratchet 118 and rotates the lobe cam 120 to disengage clutch 75. The trip cam 152 also withdraws the plunger 140 slightly before the end of this 90° rotation whereby the lock bolts 99 again engage in notches 98 and lock the table in its indexed position. The indexing operation thus being completed, the traversing of the slide continues until the dog 67 moves lever 60 to the right (Fig. 11) and engages clutch 37 with clutch gear 50. The clutch 38 still being engaged with clutch gear 34 the slide is reversed and driven rapidly forward, the dog wheel reversing therewith. When the work approaches the cutter, as illustrated at G in Fig. 14, the dog 69 moves lever 61 to the right and engages clutch 38 with gear 39 whereby the slide is moved slowly at cutting speed, this operation being that shown from G to A in Figs. 14 and 15. This cycle of operations when once started is continuous and automatic, the operator only being required to change the work while on the table at a position removed from the cutter.

It will be noted that each lock bolt 99 is provided with a plunger extension 106. For the automatic operation of the machine just described, the bunter stop 107 is placed at the right of the slide, as shown in Fig. 3, where it is engaged by the adjacent plunger 106 at the end of the cutting operation, the table thereafter being automatically indexed upon the backward movement of the slide. In performing certain milling operations, such as milling up to a shoulder, the work does not pass entirely free of the cutter and therefore indexing in the above described automatic manner is impossible. In performing such operations, the table is reversed and traversed back to its starting point without indexing, the indexing thereof being performed by hand after the traversing movement. Since automatic indexing is not to be performed the pull pin 116 must be withdrawn from the path of movement of lever 60 whereby clutch 75 will not be shifted into engagement with its driving gear 76. Also since indexing is to be performed at the end of the backward movement, it is necessary that the table should be unlocked at that time. To perform this operation, the bunter stop 107 is secured to the guideway 14$^a$ at the opposite side of the table from that shown in Fig. 3. In such position, the same will be engaged by the other plunger 106 in a manner to unlock the table at the end of the backward movement. It will be understood that when performing this milling operation, latch 71 is placed in its operative position whereby to always stop the slide at the end of its backward movement.

As stated above, the slide and table may be stopped at the end of the backward traversing movement, when desired, by means of the latch 71. The operator may also at times desire to stop the slide and table in the position shown at A in Fig. 14, i. e., at the end of a cut and before the table is indexed.

This would most ordinarily occur when the operator had been unable to change the work and desired to do so before the indexing operation. This may be accomplished by the following mechanism:

A bar 154 extends through the gear box and is provided on one end with rack teeth engaged by a pinion 155 operated by a handle 156 on the front of the saddle. The other end of this bar is bevelled at 157 in a manner to engage a bevelled spring pressed lug 158 on the lever 110. The bevelled surfaces permit the movement of the lever 110 to the right (Fig. 11) but the bar when moved into the path of the lug 158 prevents movement of the lever 110 to the left. If during the cutting operation, the operator wishes to stop the machine at the end thereof, he moves the bar 154 inwardly by means of handle 156. Then when dog 68 moves lever 60 to the left to traverse and index the table, the same is permitted only sufficient movement to disengage clutch 37 from gear 50, the bar 154 and pin 116 preventing the movement of levers 110 and 60 to engage clutches 75 and 37 for the indexing and backward traversing movements. The operations are thus brought to a standstill until again manually started by the operator.

When the operator is making adjustments or is in a position wherein a starting of the machine would be dangerous, it is desirable that the same be positively locked against such an occurrence. The two latches above described, namely, latch 71 and bar 154 provide such a positive locking mechanism. It will be noted that latch 71 prevents the movement of lever 60 to the right (Fig. 11) and that the bar 154 prevents the movement of such lever and lever 110 to the left. Therefore when the latches are both engaged to prevent such movement of these levers clutches 37 and 75 are positively held in a neutral position. It will be remembered that clutch 38 can operate the mechanism only through clutch 37. Therefore when clutches 37 and 75 are locked in neutral, the machine is positively prevented from power operation.

Rotary milling.

As heretofore stated, the machine illustrated is adapted to be used as a rotary milling machine as well as a milling machine of the reciprocating type, the same change gears and automatic features of the reciprocating mechanism being operative for rotary milling merely by making certain minor adjustments. When using the machine in this manner, the slide 20 is secured against movement on the saddle 14 by means of two hook bolts 159 mounted in the slide and engaging the edge 14^b of the saddle dove-tailed guideway 14^a.

The rotation of the table is accomplished through clutches 37 and 38. Clutch 75 is rendered inoperative during rotary milling by withdrawing the pull pin 116 from the path of movement of lever 60. It will be noted that gear 54 is mounted on a swinging bracket 160. This bracket is freely mounted on the clutch shaft 35 and the gear 54 is always in mesh with its driving gear 53. This bracket may be swung about the shaft 35 to engage gear 54 either with the gear 55 on the screw 51 or with gear 88 of the table rotating train of gears. As shown in Fig. 5, the gear box is slotted to receive a bolt 161 therethrough whereby the bracket may be thus adjusted and clamped in either of its positions.

When the gear 54 is adjusted into mesh with gear 88 to rotate the table, it is preferable to remove the gear 85 whereby the clutch shaft 77 and its gearing is rendered inoperative. The sliding keys 136 and 150 should also be placed in the neutral position whereby to render the trip latches of the table indexing and table locking mechanisms idle. Otherwise the table is free to rotate in the usual manner.

The dog wheel 62 which is driven by clutch shaft 35 is adapted to make one complete rotation for each table rotation in rotary milling and nearly a complete rotation for each full reciprocation of the slide 20 in linear milling. One full rotation of the table requires considerably more rotations of the shaft 35 than does a full reciprocation of the slide. For this reason, the dog wheel must be driven from shaft 35 at a relatively slower speed in rotary milling. The dog wheel has heretofore been described, in reference to linear milling, as being driven from shaft 35 through gears 63 and 64. It will be noted that two other gears 162 and 163 of a different ratio are provided on the same shafts with gears 63 and 64. Gears 64 and 163 are loose on their shaft and a sliding key 164 operated by a handle 165 is provided for connecting either gear to the shaft. Thus the dog wheel may be driven through gears 63 and 64 for linear milling and through gears 162 and 163 for rotary milling. Such two pairs of gears are of such ratio as to rotate the dog wheel at the relative speeds described above.

It will be understood that in rotary milling, a backward rotation of the table is unnecessary. The automatic controlling of the table operations therefore comprise only a movement of the clutch 38 to rotate the table forwardly alternately at fast and slow speeds, the dog wheel of course rotating only in a single direction, namely, in the direction of the arrow shown in Fig. 11. Dogs 67 and 68 are therefore removed from the dog wheel and as many other controlling dogs like dogs 69 and 70 are mounted on the wheel as are necessary to properly control the table rotating operations. In operation, clutch 37 is engaged with clutch gear 50 and dogs 69 and 70 alternately throw the clutch 38 in opposite directions to rotate the table slowly and rapidly. It will be understood that the dog wheel should be provided with as many pairs of dogs as there are pieces of work on the table whereby the dogs 69 and 70 of each pair will alternately throw the lever 61 to the right and left (Fig. 11) to alternately engage clutch 38 with gears 39 and 34 to alternately rotate the table at cutting speed during the cutting of a work piece and at fast speed to bring the next piece of work to the cutter. This operation is continuous and fully automatic, the operator being required only to change the work pieces as they come to a position removed from the cutter. It will furthermore be noted that the cutting speed of the table may be varied by the same change gears used in linear milling, namely, gears 43, 44, 45 and 46.

A backward rotation of the table is not only unnecessary in rotary milling, as above described, but such a movement thereof is quite undesirable since such an occurrence might mar the finished work. To so rotate the table it would be necessary to engage the clutch 37 with the backward driving clutch gear 33. Such engagement is, however, positively prevented during rotary milling by the following mechanism: An arm 166 is mounted on the same tubular shaft with clutch lever 60, namely, shaft 58 (Fig. 4). A rod 167 connected to the lower end of this arm extends through the gear box (Fig. 11). An arm 168 (Fig. 5) is pivotally mounted on the shaft carrying gears 63 and 162. A link 169 connects this arm with the swinging bracket 160 whereby swinging movement of the bracket swings the arm. When the bracket is moved to engage gear 54 with gear 88 for rotary milling the end of the arm is swung into the path of movement of rod 167, as shown in dot and dash lines in Fig. 5. In such position, it will be noted that lever 60 cannot be moved to engage clutch 37 with the backward driving clutch gear 33.

What I claim is:

1. A combined linear and rotary milling machine comprising the combination of a cutter spindle, a work table adapted to be reciprocated bodily past the spindle in a linear path or to be continuously rotated past the spindle at cutting speed, a screw for reciprocating the table, mechanism for rotating the table, a power shaft beneath the table, clutches for individually operating either the said screw or mechanism from the shaft, and separate means including a controlling element common to the screw and mechanism for automatically controlling both said table movements.

2. A combined linear and rotary milling machine comprising the combination of a base, a cutter spindle mounted therein, a knee vertically movable on the base, a slide on the knee, a work table rotatably mounted on the slide and adapted to be moved therewith bodily past the spindle in a linear path at cutting speed or to be continuously rotated past the spindle at cutting speed, and a common power means in the knee having clutches thereon operative either to reciprocate the slide and table in the said linear path or to continuously rotate the table.

3. A combined linear and rotary milling machine comprising the combination of a base, a cutter spindle mounted therein, a knee vertically movable on the base, a work table on the knee adapted to be moved bodily past the spindle in a linear path at cutting speed or to be continuously rotated past the spindle at cutting speed, a common power means in the knee operative either to reciprocate the table in its linear path or to continuously rotate the table, and means including a plurality of automatically actuated clutches in the knee for automatically controlling both said table movements.

4. In a milling machine, the combination of a base, a cutter spindle mounted therein, a knee vertically movable on the base, a work table on the knee, power means in the knee for reciprocating the table to move the same past the spindle, means including a plurality of clutches in the knee for automatically controlling the table movement for imparting fast and slow speeds to the table in the feeding direction, and means whereby the said power means may be made operative to continuously rotate the table.

5. In a milling machine, the combination of a base, a cutter spindle mounted therein, a knee vertically movable on the base, a work table on the knee adapted to be moved bodily past the spindle in a linear path or to be continuously rotated past the spindle at cutting speed, a common power means in the knee operative either to reciprocate the table in its linear path or to continuously rotate the table, and means including a plurality of clutches in the knee for automatically controlling each of the said table movements for imparting fast and slow speeds thereto in the table feeding direction.

6. A combined linear and rotary milling machine comprising the combination of a base, a cutter spindle mounted therein, a knee vertically movable on the base, a slide on the knee, a work table rotatably mounted on the slide and adapted to be moved therewith bodily past the spindle in a linear path at cutting speed or to be continuously rotated past the spindle at cutting speed, a power element in the knee, change speed gearing operated by the power element, and means whereby the power element operates through the said change speed gearing to either reciprocate the table in its linear path or to continuously rotate the table at varying cutting speeds.

7. A combined linear and rotary milling machine comprising the combination of a base, a cutter spindle mounted therein, a knee vertically movable on the base, a slide on the knee, a work table rotatably mounted on the slide and adapted to be moved therewith bodily past the spindle in a linear path at cutting speed or to be continuously rotated past the spindle at cutting speed, a power element in the knee, change speed gearing operated by the power element, means whereby the power element operates through the said change speed gearing to either reciprocate the table in its linear path or to continuously rotate the table, and means including a plurality of clutches in the knee for automatically controlling both said table movements to operate said table at varying speeds.

8. A combined linear and rotary milling machine comprising the combination of a cutter spindle, a work table adapted to be reciprocated bodily past the spindle in a linear path or to be continuously rotated past the spindle at cutting speed, a screw for reciprocating the table, gearing for operating the screw, mechanism for rotating the table, gearing for operating the said mechanism, a power shaft beneath the table, an idler gear driven from the shaft, a bracket supporting the gear and adjustable in a manner to mesh the gear with either of the said gearing for operating either the screw or the said mechanism from the shaft.

9. A combined linear and rotary milling machine comprising the combination of a cutter spindle, a work table, power means for reciprocating the table past the spindle, means including a plurality of clutches for automatically controlling the table movement for imparting fast and slow speeds to the table in the feeding direction and fast speed thereto in the backward direction, means whereby the said power means may be made operative to continuously rotate the table, and an interlocking mechanism for preventing the throwing in of the backward driving clutch when the mechanism is in such table rotating position.

10. A combined lienar and rotary milling machine comprising the combination of a cutter spindle, a work table, a screw for reciprocating the table, gearing for operating the screw, mechanism for rotating the table, gearing for operating the said mechanism, a power shaft, means whereby the shaft may be operatively connected with either of the said gearing for operating either the screw or the said mechanism from the shaft, means including a plurality of clutches for automatically controlling the table movement for imparting fast and slow speeds to the table in the feeding direction and fast speed thereto in the backward direction, and an interlocking mechanism for preventing the throwing in of the backward driving clutch when the power shaft is operatively connected to the table rotating mechanism.

11. In a machine of the class described, the combination of a reciprocating member, means including a plurality of clutches for reciprocating the member at variable speeds in one direction and at a constant return speed, a clutch operating element connected to each clutch, a dog wheel rotatable in opposite directions synchronously with the movement of the member and having dogs adjustable thereon and operative on the said elements for continuously and automatically reciprocating the member as described, and means for positively locking certain of the clutch operating means against movement whereby the reciprocating mechanism is rendered inoperative on the said member.

12. In a milling machine, the combination of a work support, a spindle adapted to support a milling cutter thereon adjacent the work support, means including a plurality of clutches for reciprocating and rotatably indexing the support, and means including a dog wheel rotatable synchronously with the reciprocations for controlling the clutches whereby the support is automatically reciprocated and rotatably indexed synchronously with and on the backward stroke thereof, the indexing operation being adapted to place an unmilled piece of work in front of the cutter ready for a milling operation thereon.

13. In a milling machine, the combination of a slide, a rotary work support thereon, a spindle adapted to support a milling cutter thereon adjacent the work support, means including a plurality of clutches for reciprocating the slide and rotatably indexing the support, a dog wheel rotatable synchronously with the reciprocations and having adjustable dogs thereon for controlling the clutches whereby the support is automatically reciprocated and the indexing clutch thrown into engagement, and automatic means for throwing the indexing clutch out of engagement at the end of the desired indexing movement, the indexing operation being adapted to place an unmilled piece of work in front of the cutter ready for a milling operation thereon.

14. In a milling machine, the combination of a work support, a spindle adapted to support a milling cutter thereon adjacent the work support, means including a pair of clutches for reciprocating the support at variable speeds in one direction, means including a clutch for rotatably indexing the support synchronously with and during its backward stroke, means including a dog wheel rotatable synchronously with the reciprocations for controlling the clutches and having adjustable dogs thereon whereby the support is automatically reciprocated through variable distances and rotatably indexed synchronously with and on the backward stroke thereof, and means whereby the dog wheel may be rendered inoperative on the indexing clutch to eliminate the indexing operation.

In testimony whereof, I hereto affix my signature.

FREDERICK C. ALLEN.